(No Model.)  2 Sheets—Sheet 1.
H. K. WHITNER.
AUTOMATIC BRAKE FOR RAILWAY CARS.
No. 354,077. Patented Dec. 7, 1886.
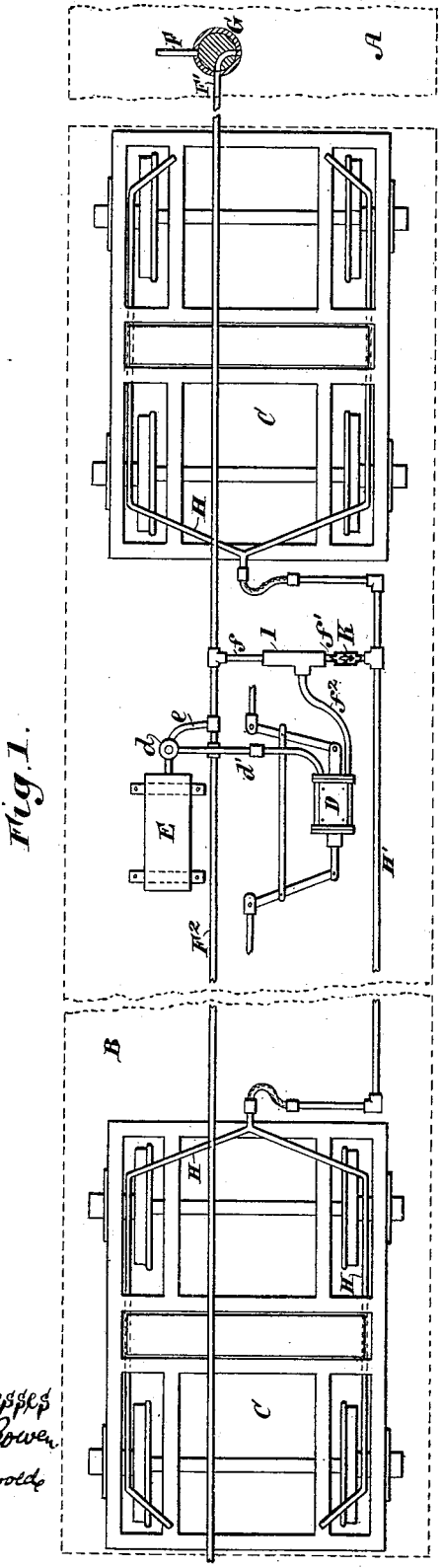
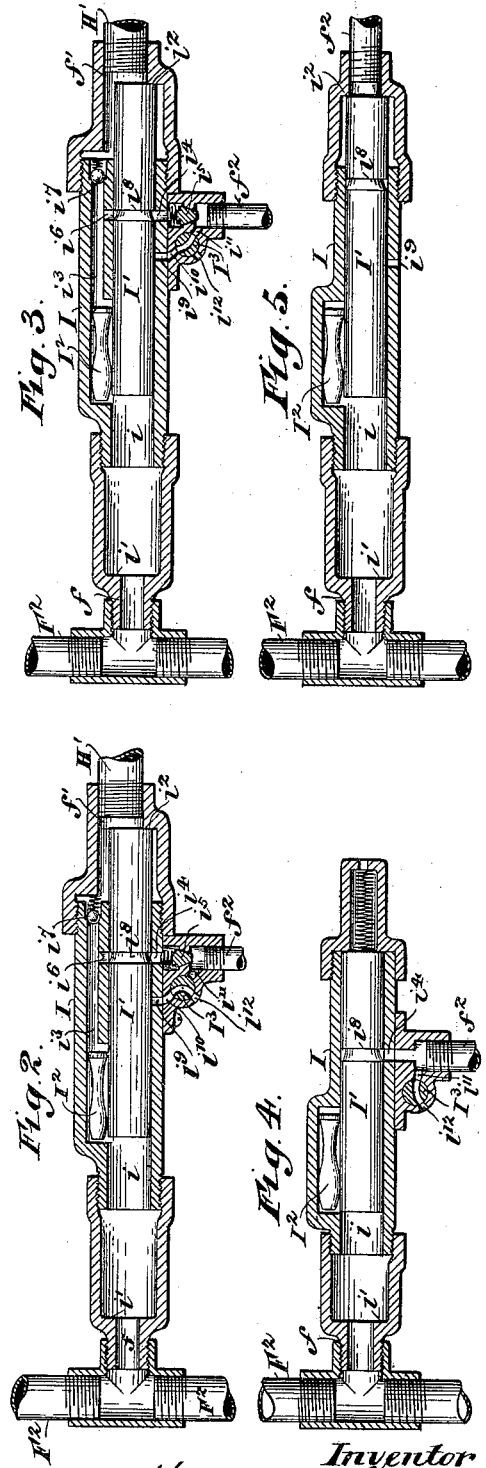
Witnesses
J. R. Bowen
L. L. Griswold
Inventor
Hiram K. Whitner
by his attorneys
Gifford & Brown (No Model.) 2 Sheets—Sheet 2.
H. K. WHITNER.
AUTOMATIC BRAKE FOR RAILWAY CARS.
No. 354,077. Patented Dec. 7, 1886.
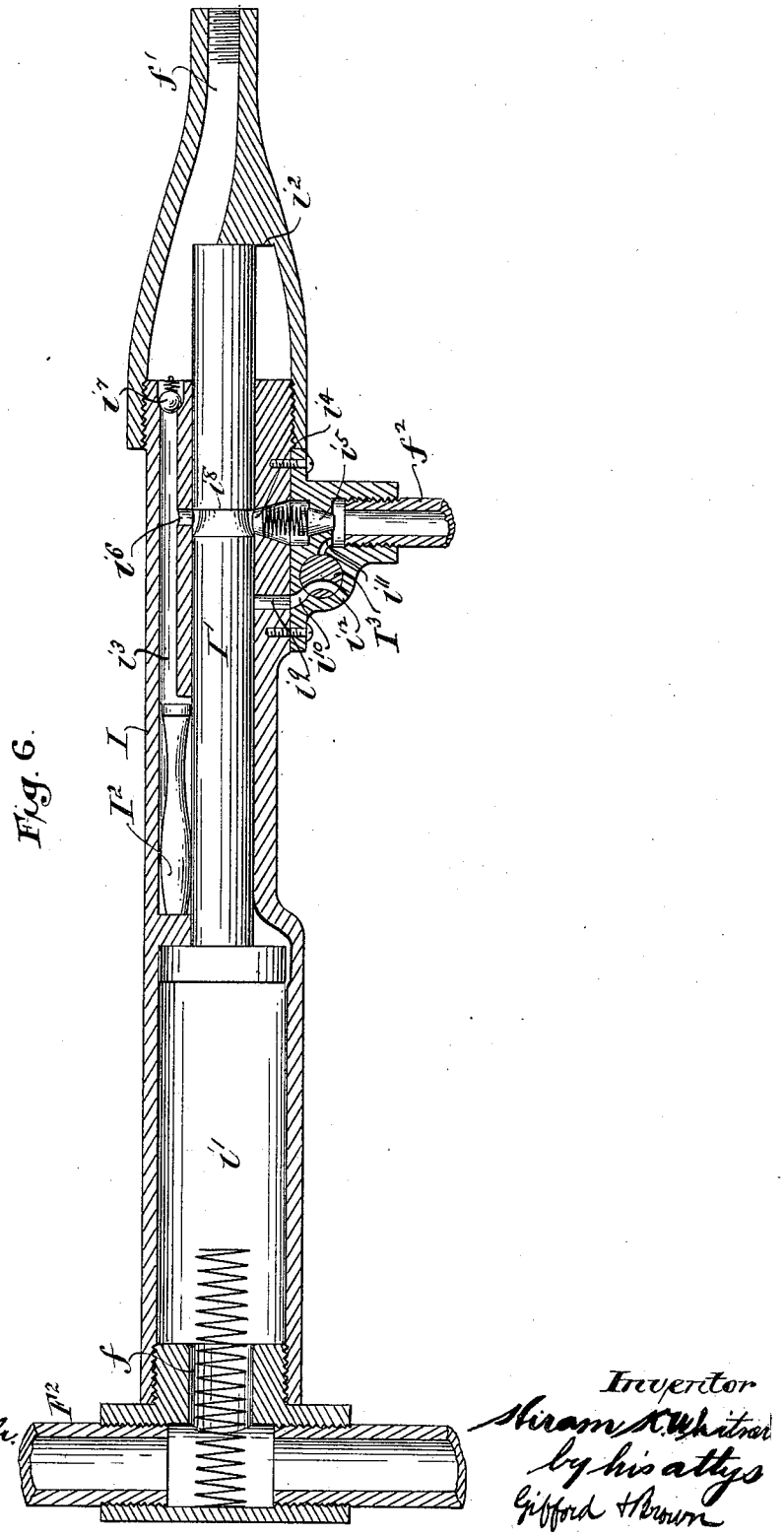
Witnesses
Maurice J Roach
J. R. Bowen
Inventor
Hiram K. Whitner
by his attys
Gifford & Brown

UNITED STATES PATENT OFFICE.

HIRAM K. WHITNER, OF NEW YORK, N. Y., ASSIGNOR TO THE WHITNER AUTOMATIC SAFETY BRAKE COMPANY, OF NEW HAVEN, CONN.

AUTOMATIC BRAKE FOR RAILWAY-CARS.

SPECIFICATION forming part of Letters Patent No. 354,077, dated December 7, 1886.

Application filed June 30, 1886. Serial No. 206,685. (No model.)

*To all whom it may concern:*

Be it known that I, HIRAM K. WHITNER, of New York, in the county and State of New York, have invented a certain new and useful Improvement in Automatic Brakes for Railway-Cars, of which the following is a specification.

I will describe in detail a railway-brake apparatus embodying my improvement, and then point out the novel features in claims.

In the accompanying drawings, Figure 1 is a bottom plan view of a railway-car and a portion of an engine having applied thereto a brake apparatus embodying my improvement. Figs. 2, 3, 4, 5, and 6 are enlarged sectional views of certain parts of the apparatus in different positions, and in some cases slightly modified.

Similar letters of reference designate corresponding parts in all the figures.

A designates a portion of a body of a locomotive-engine.

B designates the body of a railway-car intended to be coupled to the locomotive.

C designates the trucks of the railway-car.

D designates a cylinder fitted with a piston and constituting a motor whereby the brakes for the wheels of the trucks C may be applied thereto.

E designates a reservoir for containing compressed air whereby the motor D may be operated.

$F^2$ designates a pipe extending lengthwise of the car-body. It is intended to have flexible hose at the ends. One end will, by means of its hose, be connected to a pipe, F', on the locomotive-engine. The other end will be connected with a car arranged rearward of the car shown, or, if but one car is used in connection with the locomotive, the rear end of the pipe will be closed. If more cars should be used, each may be provided with apparatus like the one shown.

F designates a pipe leading from the main compressed-air reservoir arranged upon the locomotive. I have not shown this reservoir in the drawings. It may be of any suitable construction. A supply of compressed air will be maintained in it by suitable apparatus under control of the engineer.

The pipe F connects with the shell of a cock, G. The pipe F' also connects with the shell of this cock, and, as shown, in a position at right angles to the pipe F. Directly opposite the pipe F the shell of the cock G is provided with a port or passage leading to the atmosphere. The plug of the cock has a single port, which may, by rotating the plug into one position, establish communication between the pipe F and the pipe F', so as to permit of the flow of air from the main compressed-air reservoir to the pipe $F^2$, or, by rotating the plug into a different position, may establish communication between the pipe F' and the port which communicates with the atmosphere, so as to permit air to escape from the pipe $F^2$, or, in other words, so as to vent the pipe $F^2$.

The reservoir E is connected by a pipe, $e$, with the pipe $F^2$, a valve, $d$, being employed in conjunction with the pipe $e$. This valve is of ordinary construction and of such character that when the engineer turns the plug of the cock G so as to cause compressed air to flow from the main compressed-air reservoir into the pipe $F^2$, the said valve will be shifted so as to allow air to flow from the pipe $F^2$ through the pipe $e$ into the reservoir E. This is the normal condition of the apparatus while the train is in motion, and therefore a constant supply of compressed air is maintained in the reservoir E from the locomotive all this time.

When it is desirable to apply the brakes, the engineer shifts the plug of the cock G so that it will establish communication between the pipe F' and the atmosphere, thereby venting the pipe $F^2$. This will effect the shifting of the valve $d$, so that it will cut off communication between the pipe $F^2$ and the reservoir E, and establish communication between the pipe $e$, leading from the reservoir E, and a pipe, $d'$, extending to the motor D. The compressed air in the reservoir E will then operate the motor D, so as to cause the latter to apply the brakes. This shifting of the valve $d$, although it results in cutting off communication between the reservoir E and the pipe $F^2$, leaves the pipe $F^2$ unobstructed. The engineer can relax the brakes by shifting the plug of the cock G, so as to allow compressed air to again flow from the main compressed-air reservoir to the pipe $F^2$, for in this way he will be able to shift the valve $d$, so as to cause it to re-establish communication between the pipe $F^2$ and the reservoir E, and this will result in cutting off the communication which previously existed between the reservoir E and the motor D, and making a communication between the motor-pipe $d'$ and the atmosphere, so as to effect the venting of the motor.

All of the apparatus which I have above described is of ordinary and well-known construction and operation. My improvement does not interfere with the same.

I will now proceed to give a description of the parts of the apparatus which embody my improvement.

H designates frangible pipes, extending into such relation with the wheels of the trucks C that if any serious accident happened to the trucks or the wheels thereof said pipes would be fractured or severed.

H' designates a pipe extending between the trucks C. The adjacent ends of the frangible pipes H are provided with flexible hose coupled to the pipe H', the object of using flexible hose being to provide for the necessary turning of the trucks.

I designates a chest or chamber connected with the pipe $F^2$ at one end by a pipe, $f$, and with the pipe H' at the other end by a pipe, $f'$. It is shown as connected between the ends by a pipe, $f^2$, with the cylinder of the motor D. This chamber I, and the parts which are combined therewith, may be best understood by reference to Figs. 2, 3, 4, and 5. It has within it a main portion or cavity, $i$, within which is fitted a plunger or piston, I'. The chamber has a seat, $i'$, at the end which is the nearer to the pipe $F^2$. At the other end the chamber is provided with a stop, $i^2$. The plunger may move in one direction as far as the seat $i'$ and in the other direction as far as the stop $i^2$. At one side of the cavity $i$ of the chamber there is a cavity, $i^3$, extending parallel therewith. The pipe $f^2$ communicates with a port, $i^4$, which in turn communicates with the main cavity $i$ of the chamber, a valve, $i^5$, being preferably arranged in the port $i^4$, so as to permit the passage of air from the pipe $f^2$, and consequently from the cylinder of the motor D to the main cavity $i$ of the chamber I. This valve $i^5$ will not, however, permit the passage of air in the reverse direction from the main cavity $i$ of the chamber to the pipe $f^2$. Opposite the port $i^4$ there is a port, $i^6$, which establishes communication between the main cavity $i$ of the chamber and the cavity $i^3$ thereof. It will be seen that the end of the cavity $i^3$ of the chamber which is the nearer to the pipe H' has combined with it a valve, $i^7$, which will open to permit the flow of air through said cavity toward the pipe H', but which will close the said cavity $i^3$ whenever air tends to flow in the opposite direction through said cavity.

The plunger I' in the chamber I is provided with a transverse port, which may advantageously consist of a peripherical groove, $i^8$. When the plunger has moved as far as it can go away from the pipe $F^2$, and has consequently come into contact with the stop $i^2$, its port $i^8$ will establish communication between the port $i^4$ and the port $i^6$.

$I^2$ designates what I term a "lazy-dog." It consists of an arm arranged within the chamber I, having a rocking bearing or pivot-pin connection at one end, and provided at the other end with an enlargement or hook extending toward the plunger I'. This dog is so constituted that its hooked end will impinge and rest against the said plunger. If arranged over the plunger, it may be impelled against the latter by gravity, otherwise by a light spring. If the plunger is moved by any cause toward the pipe $F^2$ slowly, the hooked end of the lazy-dog will engage with the groove forming the port $i^8$ and arrest the plunger. The plunger will then be prevented from further movement in the same direction unless it shall first be moved in the opposite direction. If, however, the plunger is moved from any cause rapidly toward the pipe $F^2$, the lazy-dog will not be quick enough in its action to engage with the groove $i^8$ in the plunger; hence its name. When thus moved rapidly, the plunger may therefore reach the seat $i'$. The groove $i^8$ is rounded at the edge which is the nearer to the pipe $F^2$, and the hook of the lazy-dog may also be rounded off at the adjacent side, so that the lazy-dog cannot engage the plunger when the latter moves away from the pipe $F^2$ or toward the pipe H'.

The chamber I is provided with a port, $i^9$, shown as somewhat nearer the pipe $F^2$ than is the port $i^4$. A port, $i^{10}$, extends from the port $i^9$ to the cavity of a cock, $i^3$. From the cavity of this cock a port, $i^{11}$, extends to the port $i^4$ outward of the valve $i^5$, or, in other words, nearer the pipe $f^2$ than is the valve $i^5$. Another port, $i^{12}$, leads from the cavity of this cock to the atmosphere. The plug of the cock has a single port, and may be rotated to establish communication between the ports $i^{10}$ and $i^{11}$, the ports $i^{10}$ and $i^{12}$, or the ports $i^{11}$ and $i^{12}$.

The chamber I may advantageously be made of a number of detachable sections. One example of this feature I have shown.

The plunger I' is intended to be normally maintained in contact with the stop $i^2$, and hence as far as possible from the pipe $F^2$ while the train is in motion. It will have a tendency to assume and occupy this position, because while the train is running the pressure of compressed air is being kept up at the locomotive, and consequently the pressure is apt to be greatest at the end of the plunger which is the nearer to the pipe $F^2$ and the nearer to the source of compressed air. Should the plunger not be maintained satisfactorily in this position when made as shown, the area of its end which is the nearer to the pipe $F^2$ may be increased, or a light spring may be used to aid in forcing the plunger into the position just named. I have shown such arrangements in Fig. 6. When the plunger is in this position, it leaves uncovered the end of the cavity $i^3$ which is the nearer to the pipe $F^2$. Consequently at this time air can flow from the latter through the cavity $i^3$, past the valve $i^7$, to the pipe H'.

Before beginning my explanation of the operations of a brake apparatus embodying my improvement I will briefly allude to a defect in the old automatic air-brake apparatus, which I described before entering upon a detailed description of the apparatus embodying my improvement. The referred-to defect is the loss by the engineer of control over the brakes in the event of any rupture in the main compressed-air pipe $F^2$ of the cars through accident to the train. Such an accident effects the application of the brakes, but precludes the engineer from releasing the brakes, because the fracture of the pipe $F^2$ will vent this pipe with the same effect as the engineer could vent it, and will permanently vent it. The brakes have then to be released by going from car to car and venting the motor D and reservoirs E by means of a cock.

To appreciate the operation of my improvement, which I am about to describe, it will be important to bear in mind the fact that when the engineer properly applies the brakes he does so by slowly venting the pipe $F^2$ through the agency of the cock G, and that when the pipe $F^2$ is vented by rupture the venting will be very sudden. The venting of the pipe $F^2$ in any way will cause the plunger I' to move toward the pipe $F^2$, because of the reduction of pressure there as compared with the pressure acting on its end which is the nearer to the pipe H'. When the engineer vents the pipe $F^2$ with proper slowness, by means of the cock G, the plunger I' will move so slowly toward the pipe $F^2$ that the lazy-dog will catch and hold it against further movement in the same direction. The plunger then closes the port $i^4$. It also keeps the port $i^9$ functionless while it remains in this position. The plunger does not now in any way affect the operation of the brake apparatus, which I have described as the old brake apparatus. Any venting of the pipe $F^2$ causes the valve $i^7$ to close, so that the whole of the pressure in the pipe H' shall be exerted on the plunger I'.

Should the pipe $F^2$ be vented very suddenly by the engineer, or by an accident to said pipe, the plunger I' will move so rapidly toward the pipe $F^2$ that the lazy-dog will be unable to arrest it, and hence so that it will reach the seat $i'$. When the plunger assumes this position, it has passed beyond the ports $i^4$ and $i^6$, and also beyond the port $i^9$. Assuming that the plug of the valve $I^3$ is in the position shown in Fig. 2, so that its port establishes communication between the ports $i^{10}$ and $i^{12}$, the contents of the frangible pipes H, communicating with the pipe H', will be vented through the cavity $i$ of the chamber I, thence through the port $i^9$, thence through the port $i^{10}$, thence through the plug of the cock $I^3$, and finally through the port $i^{12}$ to the atmosphere. The pressure in the pipes H H' will have caused the closing of the valves $i^7$ and $i^5$; hence the cavity $i^3$, the port $i^6$, and the port $i^4$ will be functionless for the moment. As soon as the pressure in the cavity $i$ of the chamber I has been reduced by this venting sufficiently below the pressure in the cylinder of the motor D, the greater pressure in the latter will cause the valve $i^5$ to open. Then the said cylinder will be vented through its pipe $f^2$, the port $i^4$, the cavity $i$ of the chamber I, the port $i^9$, the port $i^{10}$, the plug of the cock $I^3$, and the port $i^{12}$.

The venting, which occurs as just described, is to be such a slow operation that it will not prevent the application of the brakes. It will, nevertheless, by its continuance release the brakes by venting the cylinder of each motor D. Thus the necessity for venting the motor-cylinders by going from car to car and turning cocks will be obviated. This operation of my apparatus induces me to term the apparatus a "time-bleeder" or "time-venter." It constitutes an important feature of my apparatus, for it absolutely precludes the severe application of the brakes by the engineer or otherwise too suddenly, and also automatically releases the brakes after they have been applied. The importance of the latter function is very great when the application of the brakes has been caused by a fracture of the pipe $F^2$, because it then performs what the engineer was powerless to effect.

Should the movement of the plunger I' to its seat $i'$ have been caused through the too sudden venting of the pipe $F^2$ by the engineer, and not through fracture of the pipe $F^2$, the engineer can cause the plunger to move to the stop $i^2$ by restoring the pressure in the pipe $F^2$ through the main compressed-air reservoir, and afterward he can vent the pipe $F^2$ slowly, so as to cause the plunger to be engaged and held by the lazy-dog, as first described.

I will now ask attention to another operation which may occur with the apparatus under certain contingencies. Should the pipe $F^2$ be vented suddenly, so as to effect the movement of a plunger of any car to its seat $i'$, and a fracture should subsequently occur in the frangible pipes H of that car, the valve $i^5$ belonging to such car will be opened, and the cylinder of the motor D of the car will be suddenly vented through the port $i^4$ and the cavity $i$ of the adjacent chamber I without the plunger leaving its seat. If, however, this fracture and consequent venting should cause the plunger I' to move to the stop $i^2$, the venting will occur through the passage of air from the motor-cylinder through the port $i^4$, the port $i^8$ of the plunger, the port $i^6$, and the cavity $i^3$, past the valve $i^7$ of the chamber I. The brakes will thus be released on this car, and the danger which their action might add to an already injured truck will be avoided.

To avoid any possible misapprehension, I will state that when a plunger, I', is in contact with its stop $i^2$, no compressed air can pass through the port $i^4$, because it will close the valve $i^5$, and that none can pass through the port $i^9$, because the plunger closes such port.

The plug of the cock I³ may obviously be adjusted so as to properly regulate the speed at which venting can occur through it.

In using the improvement which is the subject of my Letters Patent No. 338,900, the chamber I and its appurtenances will have an additional value for the cars which are in rear of the valve that divides the train into sections. These rear cars are vented by means of a vacuum, and therefore suddenly; but with my chamber I and its appurtenances applied the sudden venting will not entail the sudden application of the brakes with full force. It will, moreover, be a means for automatically releasing the brakes.

In uncoupling cars of a train the pipes F², if left open, will cause the plungers I' to reach their seats i', and thus vent the cylinders of the brake-motors so as to release the brakes.

The provision which the frangible pipes H afford for effecting the slow venting of the cylinders of the motors D by being put in communication with the said cylinders and the atmosphere, or for the rapid venting of the cylinders when said pipes are fractured, is a reason why their use is desirable. I may, however, omit them, and use in lieu thereof a special reservoir; or I may put a cap on the end of each chamber I, where the stop $i^2$ is located, and use a spring to force the plunger I' toward the seat i'. If this is done the cavity $i^3$ will be omitted. The cap will have a small opening in it for the passage of air, as shown in Fig. 4.

In lieu of the described modifications involving the omission of the frangible pipes, I may connect the pipe $f^2$, leading from the brake-motor cylinder, with the end of the chamber farthest from the pipe F². Thus I may cause pressure in the said cylinder to act against the plunger I'. This modification I have shown in Fig. 5. In this example of my invention whatever force may act on the piston of the brake-motor D will then also act on the plunger I'. If this plunger be moved slowly toward the pipe F², it will be engaged by the lazy-dog, and then will not interfere with the other parts of the brake apparatus. If, however, the plunger is moved rapidly toward the pipe F², it will reach the seat i', and then will establish communication between the brake-motor cylinder and a port, $i^{11}$, which leads to the atmosphere. The brake-motor cylinder will then be vented. The pressure in the brake-cylinder, in this example of my improvement, acts on the plunger at the beginning of the movement of the latter, instead of after the plunger has made part of its stroke or transit. With the modifications which involve the omission of the frangible pipes the function of my apparatus in quickly venting the cylinders of the motors, which is due to the fracture of the frangible pipes, is of course lost. No spring need with these modifications be used between the plunger I' and the seat i'. When a perforated cap is used, its perforation would in effect be a port leading to the atmosphere, and would be put into communication with the brake-motor cylinder whenever the plunger is moved beyond the port $i^4$ toward the main compressed-air pipe F².

I may, when I use the frangible pipes H with the chamber I, interpose a reflow check-valve, K, (see Fig. 1,) between the said chamber and the frangible pipes, or arrange one somewhere in the frangible pipes. This will, according to its position, cut off more or less of the compressed air in the frangible pipes from the chamber I, and to that extent reduce the amount of force exerted from the pipe H' on the adjacent end of the plunger I'.

Instead of employing a lazy-dog or detent for holding the plunger I' in the position it is desired to occupy when the main air-pipe F² is vented slowly, the main air-pipe may be vented only to a sufficient extent to cause the plunger to assume such position and stay there during the operation of braking.

It is a distinctive feature of my improvement that it provides for venting the cylinders of the brake-motors by venting the main compressed-air pipe F². This has never before been done to my knowledge. It is done in using my improvement whenever the said pipe F² is vented suddenly, and yet will not be done when the pipe is vented slowly.

I will now turn to a different operation of the parts constituting my improvement. To secure this operation the plug of the cock is turned to cause it to connect the ports $i^{10}$ and $i^{11}$, as shown in Fig. 3. The plunger I' of each chamber I will have the same normal position as before. Whenever the pipe F² is slowly vented the plunger will be engaged by the lazy-dog and prevented from interfering with the ordinary brake apparatus, which I have described as old. If, however, the pipe F² be quickly vented by the engineer or by accident, the plunger I' will be moved to its seat i', whereupon the compressed air in the frangible pipes H and pipe H' may flow through the cavity i of the chamber I to the port $i^9$, thence through the port $i^{10}$, thence through the plug of the cock I³ to the port $i^{11}$, and thence through the pipe $f^2$ to the cylinder of the motor D. The air in the said pipes H H' may therefore supplement the air in the reservoir E, which is adjacent to the said chamber I. The plug of the cock may be adjusted to secure this operation of the parts whenever extra force in the application of the brakes is desirable—as for instance, to compensate for an unusually steep grade or heavy load.

If the plug of the cock I³ be adjusted to connect the parts $i^{11}$ $i^{12}$, as shown in Fig. 4, the cylinder of the adjacent motor D may be vented by hand. A trainman going from car to car may in this way release the brakes from the several cars.

By turning the plug of the cock I³ so that its port will not connect any of the ports with which it is intended to act the parts embodying my improvement will be rendered functionless, except that in the event of any fracture of the frangible pipes H the cylinder of the motor D which is connected therewith will be vented.

I desire to have it understood that if a plunger, I', should stick fast, or through any other cause fail to act, it will not impair the efficacy of the ordinary brake apparatus, which I have described as old.

I desire to remark that the plunger I' is a valve actuated by pneumatic pressure, and hence a pneumatic plunger or valve.

What I claim as my invention, and desire to secure by Letters Patent, is—

1. In a brake apparatus, the combination, with a main compressed-air pipe and a brake-motor cylinder, of a chamber connected to the said pipe and brake-motor cylinder, a port in said chamber leading to the atmosphere, and a valve in said chamber which, whenever the pressure of air in the main air-pipe is reduced suddenly, will be moved to a position to establish communication between the brake-motor cylinder and the said port which leads to the atmosphere, substantially as specified.

2. In a brake apparatus, the combination, with a main compressed-air pipe and a brake-motor cylinder, of a chamber connected to said pipe and brake-motor cylinder, a port in said chamber leading to the atmosphere, and a valve in said chamber which, whenever the pressure of air in the main air-pipe is reduced slowly, will be moved to a position where it will still close the said port leading to the atmosphere, and whenever the pressure of air in the main air-pipe is reduced suddenly will be moved to a position to establish communication between the brake-motor cylinder and the said port which leads to the atmosphere, substantially as specified.

3. In a brake apparatus, the combination, with a main compressed-air pipe and a brake-motor cylinder, of a chamber connected to the said pipe and brake-motor cylinder, a system of frangible pipes or other compressed-air reservoir, a cavity or port in said chamber adapted to establish communication between such reservoir and the main compressed-air pipe, a port in said chamber leading to the atmosphere, and a valve in said chamber which, while the normal pressure of air is maintained in the main air-pipe, will open the port which is adapted to establish communication between the said reservoir and the main compressed-air pipe and close the said port which leads to the atmosphere, and which, when the pressure in the main compressed-air pipe is suddenly reduced, will close the port which is adapted to establish communication between the said reservoir and the compressed main air-pipe and establish communication between the port which leads to the atmosphere and the brake-motor cylinder, substantially as specified.

4. In a brake apparatus, the combination, with a main compressed-air pipe and a brake-motor cylinder, of a chamber connected to the said pipe and brake-motor cylinder, a system of frangible pipes or other reservoir, a cavity or port, as $i^3$, in said chamber, a port in said chamber leading to the atmosphere, and a valve in said chamber which, whenever the pressure of air in the main air-pipe is reduced suddenly, will be moved to a position to establish communication between the brake-motor cylinder, the frangible pipes or reservoir, and the port which leads to the atmosphere, substantially as specified.

5. In a brake apparatus, the combination, with a main compressed-air pipe and a brake-motor cylinder, of a chamber connected to the said pipe and brake-motor cylinder, a valve between said chamber and brake-motor cylinder, a system of frangible pipes, a cavity or port, as $i^3$, in said chamber, a port in said chamber leading to the atmosphere, a port, as $i^6$, in alignment with the port through which the brake-motor cylinder is connected with said chamber, and a valve in said chamber having a transverse port, as $i^8$, substantially as and for the purpose specified.

6. In a brake apparatus, the combination, with a main compressed-air pipe and a brake-motor cylinder, of a chamber connected to the said pipe and brake-motor cylinder, a valve between said chamber and brake-motor cylinder, a system of frangible pipes, a cavity or port in said chamber adapted to establish communication between the frangible pipes and the main compressed-air pipe, a port, as $i^6$, in alignment with the port through which the brake-motor cylinder is connected with said chamber, and a valve in said chamber provided with a transverse port, which, when the valve is in a certain position, will establish communication between the brake-motor cylinder and the said port $i^6$, substantially as and for the purpose specified.

7. In a brake apparatus, the combination, with a main compressed-air pipe and a brake-motor cylinder, of a chamber connected to the said pipe and brake-motor cylinder, a port in said chamber leading to the atmosphere, a valve in said chamber, which, whenever the pressure of air in the main compressed-air pipe is reduced suddenly, will be moved to a position to establish communication between the brake-motor cylinder and the port which leads to the atmosphere, and a cock adapted to be operated by hand to vent the brake-motor cylinder, substantially as and for the purpose specified.

8. In a brake apparatus, the combination, with a main compressed-air pipe, a brake-motor cylinder, a compressed-air reservoir connected to the brake-motor cylinder, and a valve-controlling communication between the said reservoir and brake-motor cylinder, of a chamber connected to the said main compressed-air pipe and brake-motor cylinder, a port in said chamber leading to the atmosphere, and a valve in said chamber, which, whenever the pressure of air in the main compressed-air pipe is suddenly reduced, will be moved to a position by the pressure suddenly let into said brake-motor cylinder from its reservoir, to establish communication between the said brake-motor cylinder and the port which leads to the atmosphere, substantially as and for the purpose specified.

9. In a brake apparatus, the combination, with a main compressed-air pipe and a brake-motor cylinder, of a chamber connected to the said pipe and brake-motor cylinder, a system of frangible piping or other compressed-air reservoir connected to said chamber, a valve in said chamber, and a lazy-dog or detent in said chamber, substantially as described, whereby whenever the air-pressure in the main air-pipe is reduced slowly the valve will be moved until arrested by said lazy-dog or detent, but whenever the pressure of air in the main air-pipe is reduced suddenly said valve will be moved to a position where communication will be established between the brake-motor cylinder and said reservoir.

10. In a brake apparatus, the combination, with a main compressed-air pipe and a brake-motor cylinder, of a chamber connected to said pipe and brake-motor cylinder and having a cavity or port, $i^3$, ports $i^4$ $i^6$, ports $i^9$ $i^{10}$ $i^{11}$ $i^{12}$, a cock, $I^3$, and a valve, $I'$, provided with a transverse port, $i^8$, substantially as and for the purpose specified.

HIRAM K. WHITNER.

Witnesses:
D. H. DRISCOLL,
JAS. R. BOWEN.

Correction in Letters Patent No. 354,077.

It is hereby certified that in Letters Patent No. 354,077, granted December 7, 1886, upon the application of Hiram K. Whitner, of New York, New York, for an improvement in "Automatic Brakes for Railway-Cars," an error appears in the printed specification requiring the following correction: In line 102, page 2, the reference letter "$i^3$" should read $I^3$; and that the said Letters Patent should be read with this correction therein that the same may conform to the record of the case in the Patent Office.

Signed, countersigned, and sealed this 14th day of December, A. D. 1886.

[SEAL.]

D. L. HAWKINS,
*Acting Secretary of the Interior.*

Countersigned:
R. B. VANCE,
*Acting Commissioner of Patents.*